Patented Dec. 12, 1950

2,533,557

UNITED STATES PATENT OFFICE 2,533,557

COATED, NONFIBROUS REGENERATED CELLULOSE SHEET WRAPPING MATERIAL AND PROCESS OF MAKING SAME

Aurelius Franklin Chapman, Kenmore, N. Y., assignor to E. I. du Pont de Nemours and Company, Wilmington, Del., a corporation of Delaware No Drawing. Application April 15, 1949, Serial No. 87,852

8 Claims. (Cl. 117—73)

This invention relates to transparent, flexible, non-fibrous wrapping tissue, and more particularly to sheet wrapping tissue having a base of regenerated cellulose film provided with a protective coating strongly bonded or anchored thereon, and to the process of producing such sheet wrapping tissue.

The practice of wrapping various commodities with coated regenerated cellulose film is now widespread and is of considerable importance in the packaging industry. Packages wrapped in coated regenerated cellulose film are customarily sealed by means of solvent adhesives which are well known in the trade, or are heat-sealed through the agency of heat-seal components contained in the coating compositions. In all cases the strength of the package seal is very important for adequate protection, and whether the package be solvent-sealed or heat-sealed, the strength of the seal depends primarily upon the adhesion of the coating to the base film for the reason that the adhesion of coating to coating is generally stronger than the adhesion of coating to the base film, and this is particularly true under conditions of high moisture.

A primary object of this invention therefore is to improve the strength of the seal of packages wrapped with coated regenerated cellulose film.

Another object is to provide stronger anchorage of moistureproofing coatings to base film of regenerated cellulose.

The above and other objects will more clearly appear hereinafter.

These objects are accomplished by the present invention which, briefly stated, comprises treating, as by impregnation, coating, etc., a base film of uncoated regenerated cellulose film with a partially condensed guanidine-carbamide-aldehyde resin, thereafter coating the treated base film with a conventional coating composition for regenerated cellulose film, which composition contains in addition to the usual ingredients such as film-former, plasticizer, blending agent, moistureproofing or semi-moistureproofing agent, volatile solvent, etc., an acid polymerization catalyst, such as maleic acid, and finally evaporating the solvent from the coating and completing the condensation of the partially condensed guanidine-carbamide-aldehyde resin.

Guanidine-carbamide-aldehyde resins in their partially condensed state are usually very soluble in water. They are thermosetting and are characterized by low cost and freedom from color, odor and taste. They are prepared in known manner by condensing together, under the influence of heat, an aldehyde, a carbamide and a relatively small amount of guanidine.

The aldehydes which may be used in the formation of the resins included formaldehyde, acetaldehyde, benzaldehyde, furfuraldehyde, etc., and mixtures of aldehydes. Formaldehyde is preferred and may be employed in solution, as in formalin, or in its polymeric form, such as paraformaldehyde.

While urea is the preferred carbamide, any carbamide which has at least three amino-hydrogen atoms available for reaction with the aldehyde, commonly referred to as having a functionality greater than 2, such as thiourea, and monoalky-, monoaryl-, and monoacyl- substituted ureas is operable for purposes of this invention.

The ratio of the reactants may be varied within certain limits. Each actant contributes to the final properties of the resin. The ratio of the aldehyde may be conveniently based on the amount of carbamide, and the minimum ratio is 1.0 mol per mol of carbamide while the maximum ratio is the 4 mols. In actual practice it is preferred to use a ratio between about 2.0 and 3.0 mols of aldehyde per mol of carbamide.

The amount of guanidine or its equivalents, biguanide, and phenyl guanidine, used is critical and must fall within the limits of .02–.25 mol per mol of carbamide. In most applications it is preferred to use a ratio between about .03 and about 0.15 mol per mol of carbamide. Although it is preferred to add guanidine to the reaction mixture in the form of a salt, such as the carbonate or the chloride, the above ratios are expressed on the basis of guanidine itself.

The resins may be made by condensing the reactants in aqueous solution at a pH of 5.0–7.0, and preferably 5.0–6.0, under the influence of heat, and ordinarily at or near refluxing temperature until a high degree of condensation is realized. The extent to which the reaction may be carried may vary widely as long as a water soluble product is produced. It is a characteristic of these resins to retain their solubility in, and tolerance for, water even when they are very higly condensed. In this respect they have a real advantage over condensates consisting solely of urea and formaldehyde. The resins may be used directly in the aqueous solutions in which they are prepared or they may be dried by a conventional means, such as spray drying, and dissolved when needed. The resin in the dried state is much more stable than when in solution, and hence more suited to storage and/or shipment.

The resin may be incorporated in the base film by any suitable known method. In the treatment of regenerated cellulose film a particularly convenient method is to include the resin in the usual aqueous softener bath, e. g., an aqueous glycerol bath, and impregnate the gel regenerated cellulose film with such bath, and thereafter dry the film, all in the conventional fashion. If desired, the resin may, of course, be applied to the already softened film from a separate aqueous bath.

The resin content of the softener bath through which the gel regenerated cellulose film is passed or of the aqueous solution to be applied to the dry, softened film may be varied between 0.1 and 10%, depending upon the end result desired. Excellent adhesion of the various coatings to the base film results when the resin content of the film varies between 0.15 and 2% solids based on the dry weight of the uncoated sheet and with the proper amount of acid catalyst in the final coating lacquer. Operable temperature range of the softener resin bath is from just above the freezing point of the bath to 80° C., with 55-65° C. preferred.

Regenerated cellulose is the preferred base film. However, this invention also pertains to any smooth, dense, substantially non-porous, non-fibrous, hydrophilic (water-sensitive) sheets, films or tubing precipitated from an aqueous dispersion or solution, particularly cellulosic materials such as lowly esterified or etherified cellulose derivatives, etc.

The acid catalyst to be added to the moistureproofing coating composition or lacquer may be any of the class of acid polymerization catalysts known to promote condensation or polymerization of polymerizable compounds. Maleic acid is the preferred catalyst herein. Suitable equivalents, however, are itaconic acid, ethyl acid phosphate, paratoluene sulfonic acid, phosphoric acid, acetic acid, hydroxy acetic acid, "Petrex" acid, oxalic acid, salicylic acid, dichloroacetic acid, trichloroacetic acid, malonic acid, periodic acid, fumaric acid, tartaric acid, picric acid, etc.

The acid catalyst content of the coating lacquer may be varied from 0.1-10.0%, based on the solids in the lacquer. Excessive amounts of acid are detrimental to the final coated sheet being apt to cause gradual degradation of the base film, etc. Amounts below 0.1% do not give satisfactory adhesion. Since acids vary in their effectiveness of producing hydrogen ions, the optimum concentration for each acid will, of course, be different. For instance, the preferred range for maleic acid is from 1.0% to 2.5%, for para-toluene sulfonic acid, the preferred range is 0.5% to 1.0%, etc.

This invention may be used with any of the well-known lacquers which are applied to regenerated cellulose films or their equivalents. Customarily such lacquers comprise a film-former such as cellulose nitrate, ethyl cellulose, chlorinated rubber, etc., a plasticizer for the film-former, a moistureproofing agent such as paraffin wax, a blending agent, volatile solvents, etc. Examples of typical moistureproofing compositions may be found in U. S. 1,737,187 (Charch & Prindle), U. S. 1,997,583 (Hitt), U. S. 2,079,379 (Mitchell), U. S. 2,079,395 (Bradshaw), U. S. 2,147,180 (Ubben), U. S. 2,236,546 (Mitchell), etc.

Moistureproofness, moistureproofing, moistureproofing materials, heat-seal, heat-seal bond strength and like expressions are defined in U. S. Patent No. 2,147,180 (Ubben) and are employed herein in accordance with such definitions.

The following specific examples are further illustrative of the principles and practice of this invention. Parts and percentages are by weight unless otherwise indicated.

EXAMPLE I

A typical resin is made as follows: 0.04 mol of guanidine nitrate is dissolved in 2.3 mols of formaldehyde in the form of a 37% by weight formalin solution. The pH of the resultant clear solution is adjusted to 5.3 with aqueous 10% sodium carbonate or sodium hydroxide solution. One mol of urea is added and the mixture heated to boiling and refluxed for 2 hours. The clear solution obtained is cooled to room temperature, and is stabilized by adjusting the pH to 6.5–7.0 thru the addition of aqueous sodium hydroxide.

A sheet (control) of 300-gauge (approximately 0.0009" thick) gel regenerated cellulose film is impregnated with an aqueous glycerol softening bath, dried, and thereafter coated on both sides at the rate of 3 grams of coating solids per square meter of film with the following moistureproofing composition:

| | Parts |
|---|---|
| Nitrocellulose (11.4% nitrogen) | 43.3 |
| Ester gum | 30.4 |
| Dicyclohexyl phthalate | 29.3 |
| Hydrogenated castor oil phthalate | 10.5 |
| Crystalline paraffin wax—60° C. M. P. | 3.5 |
| Ethyl acetate | 574.0 |
| Ethyl alcohol | 20.0 |
| Toluene | 289.0 |

A second sheet (A) of 300 gauge gel regenerated cellulose film is impregnated with the glycerol softening bath to which is added sufficient of the aqueous solution of guanidine-urea-formaldehyde resin to incorporate in the sheet 0.3% by weight of resin based on the weight of cellulose. After drying, this sheet is coated at the rate of 3 grams of coating solids per square meter of film with the moistureproofing composition specified above to which is added 0.6% by weight (based upon the solids content of the lacquer) of maleic acid.

A third sheet (B) of 300 gauge gel regenerated cellulose is impregnated with the glycerol softening bath to which is added sufficient of the aqueous solution of guanidine-urea-formaldehyde resin to incorporate in the sheet 0.6% of resin, and this sheet is coated as was sheet A.

The adhesion of the moistureproof coatings on the sheets is measured in the following standard manner and is listed in Table I:

A set of five samples, 2" x 3", is cut from each sheet—one sample near each edge and three from intermediate positions across the sheet; a second set is cut just below the first. An area ¾" x 2" at the end of one sample is moistened with methyl Cellosolve. The sample taken just below is then placed over the first one, edges aligned and opposite faces of the sheet in contact. The solvent-treated area is then heat sealed at 130° C., 20 p. s. i. and 2 seconds dwell time. The sealed sample is then cut to 1½" wide, trimming both edges. The two strips so sealed are opened at the free ends and placed in a Suter testing machine. One end remains stationary and the other is moved away at a constant speed of 12" per minute. The force in grams required to pull the sheets apart is taken as a measure of the solvent seal bond strength or the adhesion of the moistureproof coating to the base sheet.

Table I

| Sheet | Resin in Base Sheet | Maleic Acid in M. P. Lacquer | Solvent Seal Strength [1] | | | | | |
|---|---|---|---|---|---|---|---|---|
| | | | E | EC | C | WC | W | Avg. |
| | Per cent | Per cent | | | | | | |
| Control | 0 | 0 | 74 | 104 | 128 | 125 | 38 | 94 |
| A | 0.3 | 0.6 | 199 | 323 | 345 | 241 | 243 | 270 |
| B | 0.6 | 0.6 | 213 | 329 | 397 | 342 | 243 | 305 |

[1] NOTES:
E = sample taken near one edge (east)
EC = sample taken midway between E and C
C = sample taken in center of film
WC = sample taken midway between C and W
W = sample taken near other edge (west)

From the average values it is seen that practically a three-fold improvement in adhesion results when the base film contains 0.3% guanidine-urea-formaldehyde resin and there is 0.6% maleic acid in the coating lacquer; and slightly more than that when the film contains 0.6% resin and 0.6% maleic acid in the coating lacquer.

EXAMPLE II

Sheets of 300-gauge gel regenerated cellulose film were treated as follows:

Control—No resin.
Sheet C—Guanidine-urea-formaldehyde resin of Example I + enough maleic acid in softener bath to give a pH of 4.0.
Sheets D, E, F and G—Resin in softener bath and acid catalyst in final coating lacquer.
Sheet H—Resin applied to dry film from water solution and acid catalyst in the final coating lacquer.

Table II shows the heat seal bond strengths of the various sheets after they have been coated with the following moisture-proof, heat sealing composition.

Parts by weight
Nitrocellulose (11.4% nitrogen) _____ 56.2
"Petrex-7-HT" resin (diethylene glycol ester of "Petrex" acid (terpene-maleic acid), Hercules Powder Co., U. S. 2,236,546 _____ 11.7
Dibutyl phthalate _____ 19.9
Dicyclohexyl phthalate _____ 19.9
Hercules Polypale WB (H₂SO₄—modified wood rosin), Hercules Powder Co., U. S. 2,017,866 _____ 5.8
Crystalline paraffin—60° C. M. P. _____ 3.5
Ethyl acetate _____ 573.9
Ethyl alcohol _____ 24.1
Toluene _____ 285.0

Table II

| Sheet | Resin in Softener Bath | Resin in Water applied to Dry Film | Resin Associated with Film | Maleic Acid in M. P. Heat Sealing Lacquer | Peel [1] Heat Seals at 81% R. H. |
|---|---|---|---|---|---|
| | | | Per cent | | |
| Control | 0 | | 0 | 0 | 10 |
| C | 3% + maleic acid to give pH = 4. | | 2.0 | 0 | 60 |
| D | 0.3% | | 0.3 | 2½% maleic acid | 210 |
| E | ½% | | 0.4 | do | 225 |
| F | 1% | | 0.8 | do | 240 |
| G | 3% | | 2.0 | do | 250 |
| H | | 6 | 0.6 | do | 300 |

[1] Peel heat seal = force required to pull seal apart after initial rupture, when seals have been conditioned at 81% R. H. for 24 hours. This gives a very severe test of adhesion. The adhesion of the moistureproof, heat sealing coatings was measured in terms of heat seal bond strength, which method is defined in U. S. 2,147,180 (Ubben).

From Table II it is readily seen that outstanding adhesion is obtained only when the acid catalyst is placed in the final coating lacquer.

EXAMPLE III

Sheets of 300-gauge regenerated cellulose film are treated as follows:

Sheet J—Resin of Example I + maleic acid catalyst in softener bath.
Sheet K—Resin of Example I in softener bath and catalyst in final lacquer.
Control—No resins used.

These sheets are then coated with the following semi-moistureproof, heat sealing formula disclosed in the copending application of C. H. Hofrichter, Jr., S. N. 28,050, filed May 19, 1948 and now abandoned:

Parts by weight
Nitrocellulose (11.4% nitrogen) _____ 49.75
Dibutyl phthalate _____ 16.1
Dicyclohexyl phthalate _____ 16.1
Hercules Polypale WG (H₂SO₄—modified wood rosin), Hercules Powder Co., U. S. 2,017,866 _____ 3.0
Pentaerythritol distearate _____ 2.0
"Petrex" 7-HT (diethylene glycol ester of "Petrex" acid (terpene-maleic acid)), Hercules Powder Co., U. S. 2,236,546 ___ 13.05
Ethyl acetate _____ 490.0
Toluene _____ 240.0
Ethyl alcohol _____ 240.0

The adhesion of the semi-moistureproof, heat sealing films are measured in terms of heat seal bond strength. Results are given in Table III:

Table III

| Sheet | Resin in Softener Bath | Maleic Acid in Lacquer | Heat Seal | |
|---|---|---|---|---|
| | | | 35% R. H. | 80% R. H. |
| | | Per cent | | |
| J | 3% + 0.17% maleic acid | 0 | 135 | 75 |
| K | 3% | 2½ | 540 | 400 |
| Control | 0 | 0 | 130 | 20 |

Here again, it is seen that when the acid catalyst is placed in the final coating lacquer and the resin is impregnated in the gel film in the softener bath, a tremendous improvement in coating adhesion results. If both resin and acid catalyst are in the softener bath, inferior adhesion is realized.

EXAMPLE IV

Sheets of 300-gauge regenerated cellulose film are impregnated with softener bath containing 1% of the resin of Example I and then coated with the moistureproof, heat sealing composition used in Example II, to which is added various acid polymerization catalysts. The ingredients and results of 81% R. H. heat seal tests are given in Table IV:

*Table IV*

[1% resin in softener bath]

| Sheet | Acid Used in Final Lacquer | 81% R. H. Heat Seal |
|---|---|---|
| L | 2% Para-toluene sulfonic acid | 280 |
| M | 4% Itaconic acid | 220 |
| N | 5% Hydroxy acetic acid | 260 |
| O | 2.5% Maleic acid | 240 |
| P | 3.0% Hydroxy acetic acid | 208 |
| Q | 4.0% "Petrex" acid | 212 |
| R | 3.0% Oxalic acid | 263 |
| S | 4.0% Picric acid | 261 |
| T | 1.0% Trichloracetic acid | 246 |

EXAMPLE V

When hydroxy acetic acid or itaconic acid is placed in the softener bath along with the resin of Example I, as is done with maleic acid in sheet C, the heat seal bonds are very poor as shown in Table V:

*Table V*

| Sheet | Resin+Acid in Softener Bath | Resin Associated with Film (Per cent) | Peel Heat Seals at 81% R. H. |
|---|---|---|---|
| U | 3% resin+hydroxy acetic acid to give pH of 4.0. | 2.5 | 50 |
| V | 3% resin+itaconic acid to give pH of 4.0. | 2.5 | 50 |

EXAMPLE VI

A sheet (control) of 300-gauge gel regenerated cellulose film is impregnated with an aqueous glycerol softening bath (pH-6.5), dried, and thereafter coated on both sides at the rate of 3 grams of coating solids per square meter of film with the following moistureproofing composition:

| | Parts |
|---|---|
| Ethyl cellulose (medium viscosity) | 55.0 |
| Damar | 8.1 |
| Dibutyl phthalate | 15.0 |
| Dicyclohexyl phthalate | 29.7 |
| Formaldehyde-aromatic sulfonamide condensate | 5.7 |
| Crystalline paraffin wax—60° C. M. P. | 3.5 |
| Ethyl acetate | 574.0 |
| Ethyl alcohol | 33.0 |
| Toluene | 276.0 |

A second sheet (W) of 300-gauge gel regenerated cellulose film is impregnated with the glycerol softening bath to which is added 0.5% by weight (based on the total weight of the bath) of guanidine-urea-formaldehyde resin and sufficient maleic acid to give a pH of 4. After drying, this sheet is coated at the same rate and with the same coating composition specified above.

A third sheet (X) of 300-gauge gel film is impregnated with an aqueous glycerol softening bath containing 0.5% of the guanidine-urea-formaldehyde resin. After drying, this sheet is coated at the same rate with the coating composition specified above modified by the addition of 2.5% of maleic acid. Table VI shows the results of the heat seal tests at 81% R. H.

*Table VI*

| Sheet | 81% R. H. Heat Seal |
|---|---|
| Control | 10 |
| W | 51 |
| X | 128 |

EXAMPLE VII

A sheet (control) of 300-gauge gel regenerated cellulose film is impregnated with an aqueous glycerol softening bath, dried, and thereafter coated on both sides at the rate of 3 grams of coating solids per square meter of film with a coating composition consisting of 17.5% by weight of hydrolyzed ethylene/vinyl acetate copolymer containing ethylene and vinyl acetate in the ratio of 2.7 to 1, 41.25% of toluene and 41.25% of isobutanol.

A second film (Y) of 300-gauge gel film is impregnated with an aqueous glycerol softening bath containing 0.5% by weight (based on the total weight of the bath) of guanidine-urea-formaldehyde resin and sufficient maleic acid to give a pH of 4. After drying, the sheet is coated at the same rate with the coating above specified.

A third sheet (Z) of 300-gauge gel film is impregnated with aqueous glycerol softener bath containing 0.5% of the guanidine-urea-formaldehyde resin. After drying, the sheet is coated at the same rate with the coating composition specified above modified by the addition of 2.5% of maleic acid. The results of heat seal tests at 81% R. H. is shown in Table VII.

*Table VII*

| Sheet | 81% R. H. Heat Seal |
|---|---|
| Control | 50 |
| Y | 250 |
| Z | 326 |

As many widely different embodiments can obviously be made without departing from the spirit and scope of this invention it is to be understood that said invention is not restricted in any way except as set forth in the appended claims.

I claim:

1. In the process of producing coated sheet wrapping material wherein transparent, non-fibrous, water-sensitive film of cellulosic material is coated with a protective coating composition from the group consisting of moistureproofing and semimoistureproofing coating compositions for the cellulosic material the improvement which comprises incorporating in the uncoated film of cellulosic material a water-soluble, partially condensed guanidine-carbamide-aldehyde resin, obtained by reacting an aldehyde, guanidine and a carbamide having a functionality greater than 2 in the proportion of from 1 to 4 mols of aldehyde and from 0.02 to 0.25 mol of guanidine per mol of carbamide, drying said film, and thereafter coating the resulting resin-containing film with said coating composition containing an acid polymerization catalyst effective to promote further condensation of the resin.

2. In the process of producing coated sheet wrapping material wherein transparent regenerated cellulose film is coated with a protective composition from the group consisting of moistureproofing and semimoistureproofing coating compositions for regenerated cellulose, the improvement which comprises incorporating in uncoated regenerated cellulose film a water-soluble, partially condensed guanidine-carbamide-aldehyde resin obtained by reacting an aldehyde, guanidine, and a carbamide having a functionality greater than 2 in the proportion of from 1 to 4 mols of aldehyde and from 0.02 to 0.25 mol of guanidine per mol of carbamide, drying said film, and thereafer coating the resulting resin-containing film with said coating composition containing an acid polymerization catalyst effective to promote further condensation of the resin.

3. In the process of producing coated sheet wrapping material wherein transparent regenerated cellulose film is coated with a protective composition from the group consisting of moistureproofing and semimoistureproofing coating compositions for regenerated cellulose, the improvement which comprises coating dried regenerated cellulose film containing from 0.05% to 10.0% by weight of a water-soluble, partially condensed guanidine-carbamide-aldehyde resin obtained by reacting aldehyde, guanidine, and carbamide having a functionality greater than 2 in the proportions of from 1 to 4 mols of aldehyde and from 0.02 to 0.25 mol of guanidine per mol of carbamide, with the protective composition for regenerated cellulose containing from 0.1% to 10.0% by weight, based on the solids content of the composition, of an acid polymerization catalyst effective to promote further condensation of the resin.

4. In the process of producing coated sheet wrapping material wherein transparent regenerated cellulose film is coated with a protective composition from the group consisting of moistureproofing and semimoistureproofing coating compositions for regenerated cellulose the improvement which comprises coating dried regenerated cellulose film containing from 0.05% to 10.0% by weight of water-soluble, partially condensed guanidine-urea-formaldehyde resin obtained by reacting formaldehyde, guanidine, and urea in the proportion of from 1 to 4 mols of formaldehyde and from 0.02 to 0.25 mol of guanidine per mol of urea, with the protective composition for regenerated cellulose containing from 0.1 to 10.0% by weight, based on the solids content of the composition, of an acid polymerization catalyst effective to promote further condensation of the resin.

5. A coated transparent wrapping tissue obtained by the process of claim 4.

6. The process of claim 4 wherein the acid polymerizing catalyst is maleic acid.

7. The process of claim 6 wherein the protective composition for regenerated cellulose contains from 1.0% to 2.5% by weight of maleic acid.

8. The process of producing coated, transparent, sheet wrapping material which comprises impregnating gel regenerated cellulose film with an aqueous softening bath containing from 0.05% to 10% by weight of a water-soluble, partially condensed guanidine-urea-formaldehyde resin obtained by reacting formaldehyde, guanidine and urea in the proportions of from 1 to 4 mols of formaldehyde and from 0.02 to 0.25 mol of guanidine per mol of urea, drying the impregnated film and thereafter coating the impregnated film with a protective composition from the group consisting of moistureproofing and semimoistureproofing coating compositions for regenerated cellulose containing from 0.1% to 10.0% by weight, based on the solids content of the composition, of maleic acid.

AURELIUS FRANKLIN CHAPMAN.

REFERENCES CITED

The following references are of record in the file of this patent:

UNITED STATES PATENTS

| Number | Name | Date |
|---|---|---|
| 2,159,007 | Charch et al. | May 23, 1939 |
| 2,161,805 | Dreyfuss et al. | June 13, 1939 |
| 2,235,141 | Dreyfuss et al. | Mar. 18, 1941 |
| 2,280,829 | Jebens | Apr. 28, 1942 |
| 2,385,320 | Greene et al. | Sept. 18, 1945 |
| 2,395,825 | Hesler | Mar. 5, 1946 |